Sept. 21, 1937.   J. E. PADGETT   2,093,572
SHAFT SEALING DEVICE
Filed Oct. 4, 1934   2 Sheets-Sheet 1
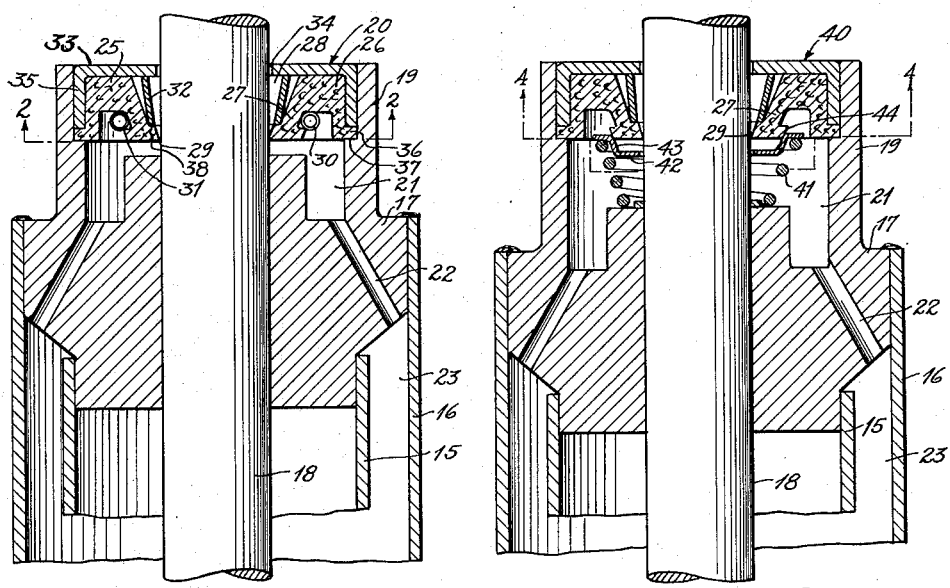
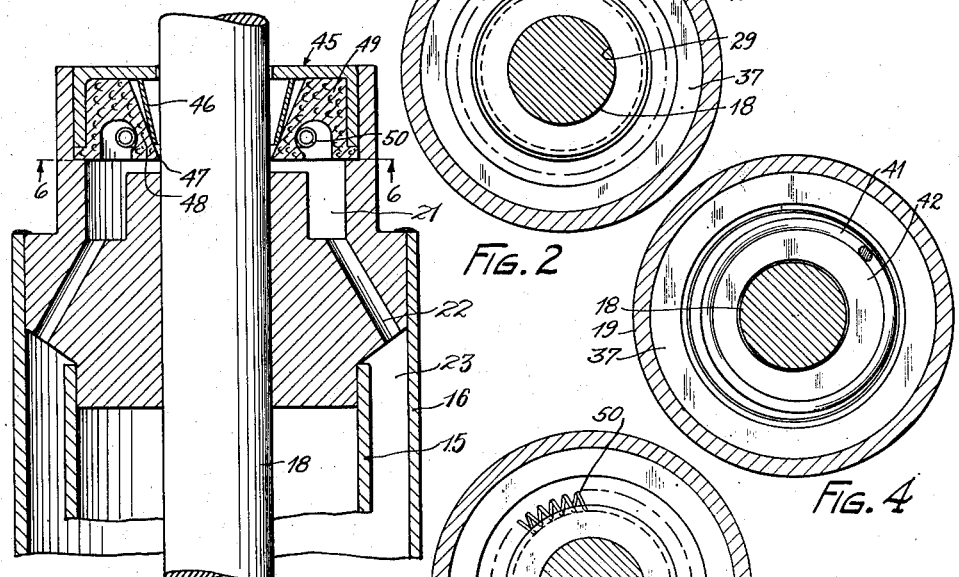

Sept. 21, 1937. J. E. PADGETT 2,093,572
SHAFT SEALING DEVICE
Filed Oct. 4, 1934  2 Sheets-Sheet 2
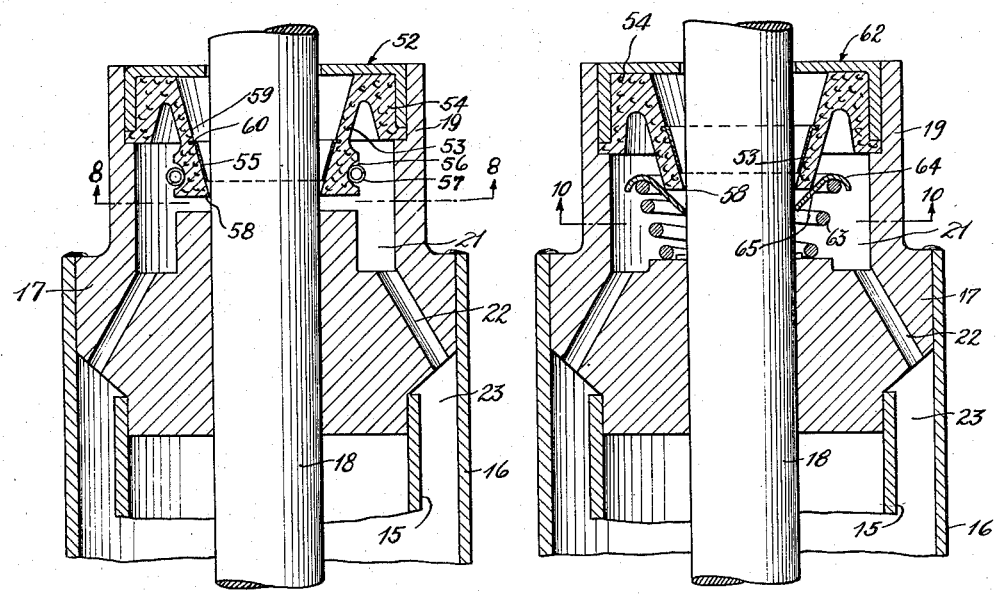
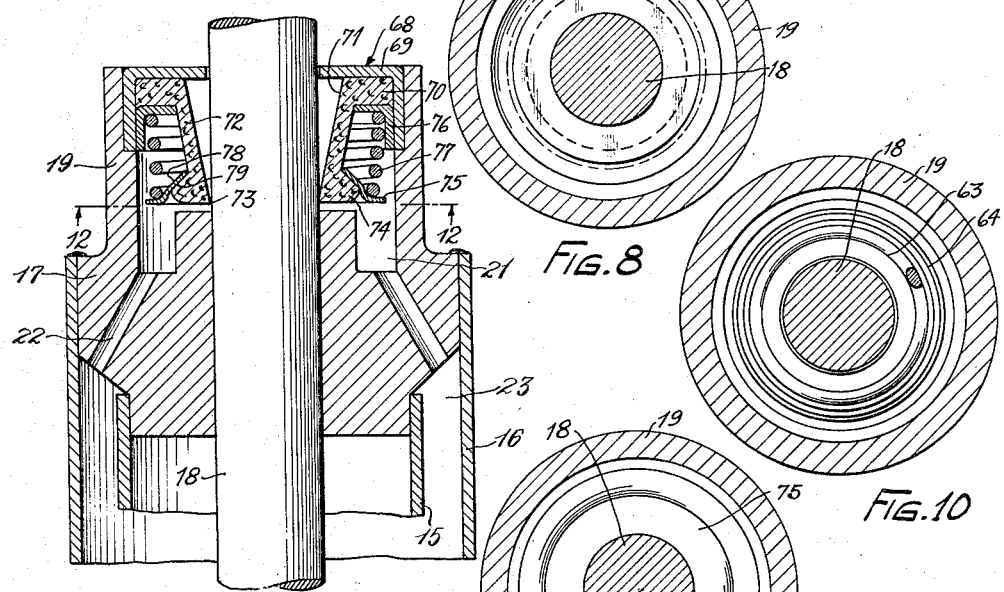
INVENTOR
JOSEPH E. PADGETT
Kwis, Hudson & Kent
ATTORNEYS Patented Sept. 21, 1937

2,093,572

UNITED STATES PATENT OFFICE 2,093,572

SHAFT SEALING DEVICE

Joseph E. Padgett, Toledo, Ohio, assignor, by mesne assignments, to General Motors Corporation, Detroit, Mich., a corporation of Delaware Application October 4, 1934, Serial No. 746,815

4 Claims. (Cl. 286—26)

This invention relates to sealing devices for preventing fluid leakage and, as its principal object, aims to provide an improved device of this kind which will be very efficient and reliable when used in conjunction with an actuating shaft.

Another object of this invention is to provide an improved shaft sealing device having a packing element formed of flexible material and provided with a tapering sleeve part having at its inner end a relatively sharp edge or corner which is pressed against the shaft, and wherein means is provided for maintaining substantially the shape of the sleeve part such that portions thereof, other than said edge, are prevented from contacting the shaft.

A further object of the invention is to provide a shaft seal, of the type referred to, wherein the packing element comprises a molded body of non-metallic flexible material having an integral tapered sleeve part which extends inwardly around the shaft and has at its inner end a relatively sharp annular edge for engagement with the shaft.

Still another object of the invention is to provide a shaft seal, of the type referred to, wherein a metal ferrule is disposed in the tapering sleeve part for maintaining substantially the shape of the latter, such that an annular edge or corner at the inner end of the sleeve part may be pressed against the shaft while other portions of the sleeve part are prevented from contacting the shaft.

It is also an object of this invention to provide an improved seal, of the type referred to, wherein the packing element comprises a body of flexible material having a tapering sleeve part cooperating with the shaft and a flange adapted to be clamped against a shoulder of the recess to be sealed.

Other objects and advantages of the invention will be apparent from the following description when taken in conjunction with the accompanying sheets of drawings, wherein Fig. 1 is a longitudinal sectional view showing an improved shaft seal constructed according to my invention.

Fig. 2 is a transverse sectional view taken on line 2—2 of Fig. 1.

Fig. 3 is a longitudinal sectional view of another shaft seal constructed according to my invention.

Fig. 4 is a sectional view taken on line 4—4 of Fig. 3.

Fig. 5 is a longitudinal sectional view showing another embodiment of my improved shaft seal.

Fig. 6 is a sectional view taken on line 6—6 of Fig. 5.

Figs. 7, 9 and 11 are longitudinal sectional views taken through other embodiments of the improved seal of my invention, and Figs. 8, 10 and 12 are sectional views taken, respectively, on the corresponding section lines of Figs. 7, 9 and 11.

In the accompanying drawings to which detailed reference will now be made, I have shown improved sealing devices for preventing leakage of fluid around an actuating shaft. For purposes of illustrating the invention, the drawings show preferred embodiments of my improved shaft seal, but it will be understood, of course, that the invention may be embodied in various structures and arrangements other than the particular ones herein illustrated and described.

Before proceeding with the detailed description of the improved seal of my invention, I shall describe briefly one form of device with which the seal may be used, although it should be understood that the utility of my improved seal is not limited to this nor any other particular application, but may be used wherever an efficient shaft seal is required. The device just referred to is a fluid shock absorber and in the drawings I have shown my improved seal as applied to a device of this kind.

The type of shock absorber illustrated in this instance is a direct acting shock absorber having cylinder and reservoir barrels 15 and 16 arranged in coaxial relation with their upper ends connected to closure plug 17. A piston actuating shaft 18 extends into the cylinder formed by the barrel 15 and is reciprocably slidable in the plug 17 as a bearing. The outer portion 19 of the plug 17 is recessed to receive my improved seal 20 and to provide a fluid collecting chamber 21 inwardly of the seal. One or more passages 22 are formed in the plug 17 to connect the chamber 21 with the reservoir chamber 23 for returning fluid leakage to the latter from the collecting chamber.

As shown in Figs. 1 and 2 of the drawings my improved seal is mounted in the recessed outer portion 19 of the plug member 17 and cooperates with the shaft 18 to scrape the fluid therefrom. This improved seal includes a body 25 of non-metallic flexible material which has been molded or otherwise formed to the desired shape. The material used for the body 25 is preferably a flexible, tough, non-absorbent, more or less rubber-like material which can be molded or formed to the desired shape, as by vulcanizing or other suitable process, and which is not subject to deterioration by reason of its coming in contact with oil or other fluids. Any material which possesses these or similar characteristics, such as certain commercially available synthetic gums, may be used.

The body 25, comprising the packing element of my improved seal, is preferably formed with a ring part 26 which is disposed around the shaft 18, and a tapering sleeve part 27 which is formed integral with the ring part and extends inwardly around the shaft. According to my invention, the sleeve part 27 is formed so that the tapering recess 28, which extends into the body 25, is considerably larger in diameter than the shaft and such that only the relatively sharp annular edge or corner 29 at the inner end of the sleeve part, engages the shaft. In providing the packing element with such a relatively sharp annular edge which contacts with the shaft, I find that upon the outward movement of the shaft in the bearing 17, the sharp edge cuts through any film of fluid clinging to the shaft and performs a scraping action against the surface of the shaft, such that leakage of fluid outwardly past the packing element is effectively prevented.

To insure the desired scraping contact between the annular edge 29 and the surface of the shaft, I provide means for pressing this annular edge against the shaft. The means utilized for this purpose may be of varying construction and may depend upon the construction and arrangement of the packing element, the degree of pressure required, or various other factors. In the arrangement of Fig. 1 I secure the desired pressing of the annular edge 29 against the shaft by employing an endless or "garter" spring 30 which is disposed around the sleeve part and contracts the same to press the edge against the shaft. For obtaining the desired action by the "garter" spring 30 and for retaining the same in surrounding relation on the tapering sleeve part 27, I provide the latter with an annular retaining bead 31 adjacent its inner end.

I have found that when portions of the tapering sleeve part 27, other than the relatively sharp annular edge 29, contact with the surface of the shaft, there is a tendency for some of the fluid to creep along between the shaft and the packing element. Once such a creeping of the fluid between the shaft and the packing element has begun, the fluid seems to act as a wedge which prevents the packing from exerting the desired scraping action against the shaft and leakage of fluid continues to take place thereafter. To prevent undesirable distortion or collapse of the tapering sleeve part 27 by the spring 30, which would result in portions of the sleeve part other than the edge 29 coming in contact with the shaft and destroying the sealing action, I provide means for maintaining substantially the shape of the sleeve part such that only the sharp edge contacts the shaft.

The sleeve part 27 may be supported or maintained against distortion or collapse in various ways, but I find that a relatively rigid or stiff ferrule 32 disposed in the recess 28 around the shaft 18 will efficiently perform this function. The ferrule may contact with a substantial portion of the inner surface of the tapered recess 28, or, as shown in Fig. 1, it may have a different angle of taper than the inner wall of the recess, such that only the inner end portion of the ferrule engages the sleeve part. The ferrule is made of somewhat shorter length than the length of the packing element, so that the inner end of the ferrule stops short of the annular edge 29 and thus the ferrule does not prevent this annular edge from being pressed into scraping engagement with the shaft by the spring 30. This ferrule may be formed of any suitable material having the requisite stiffness or rigidity, such as metal, fiber or composition.

My improved seal may also include a metal shell 33 of substantially cup-like form and having an opening 34 through which the shaft extends. The flange or skirt portion 35 of the metal shell is arranged to extend into the recessed outer plug part 19 and may have a press fit in the recess. The ring part 26 of the packing element is seated in the cup-like metal shell, as shown in Fig. 1, and may have an annularly extending substantially radial flange 36 which engages an annular shoulder 37 of the recess and may be clamped against such shoulder by the inwardly extending skirt portion of the metal shell 33. The metal shell 33 serves to protect the flexible packing element and also cooperates with the flange 36 and the shoulder 37 for retaining the packing element in proper position in the recess.

The tapering recess 28 of the packing element may be formed of such proportions as to provide an annular shoulder 38 just outwardly of the sharp annular edge 29 and the ferrule 32 may be of such length that its inner end will be retained in engagement with this annular shoulder when the packing element is seated in the cup-like metal shell 33. Thus the metal shell also serves to retain the ferrule 32 in position in the recess of the packing element to properly support the sleeve part 27.

From the arrangement of sealing structure just described, it will be seen that the sharp annular edge or corner 29 is always maintained in engagement with the surface of the shaft and as the latter is moved outwardly through the bearing plug 17, the edge 29 will cut through the film of fluid clinging to the shaft and scrape such fluid therefrom. The metal ferrule prevents distortion or collapse of the sleeve part of the packing element such that the desired pressure of the edge 29 against the shaft can be obtained without any portions of the packing element other than this edge coming in contact with the shaft.

In Figs. 3 and 4 of the drawings I have shown a shaft seal 40 which is identical with that of Fig. 1, with the exception of the means for pressing the annular edge 29 against the shaft.

In the seal 40 of Fig. 3, the necessary pressure of the edge 29 against the shaft to produce the desired scraping action, is obtained by means of a coil spring 41 disposed around the shaft 18 and a spring plate 42 which cooperates with an inner end of the sleeve part of the packing element. The spring plate 42 and the inner end of the sleeve part 27 of the packing element are provided with correspondingly tapered annular surfaces 43 and 44 which are arranged so that when the spring plate 42 is biased outwardly by the spring 41 the inner end of the sleeve part 27 will be contracted around the shaft to press the edge 29 thereagainst.

In Figs. 5 and 6 of the drawings I have shown a seal 45 which is similar to the seal 20 of Fig. 1, but wherein the inner end of the ferrule 46 simply terminates short of a sharp annular edge 47 without engaging a shoulder on the sleeve part 48 of the packing element 49. In other respects, the seal 45 is substantially the same as the seal 20 of Fig. 1 and the desired scraping action of the annular edge 47 is obtained by pressure supplied by the garter spring 50, while distortion or collapse of the sleeve part of the packing is prevented by the ferrule 46.

In Figs. 7 and 8 I have shown a seal 52 of a construction generally similar to that of Fig. 1, with the exception that the sleeve part 53 of the packing element 54 is somewhat longer, and a different arrangement is provided for the ferrule 55. In the seal 52 the inner end of the elongated sleeve part 53 is constructed with an annular groove or recess 56 in which the garter spring 57 engages. The garter spring contacts the inner end of the sleeve part so as to press the relatively sharp annular edge 58 into scraping engagement with the surface of the shaft 18.

The ferrule 55 supports the portions of the sleeve part adjacent to the edge 58 so that such adjacent portions of the sleeve part will not be pressed against the shaft by the action of the spring 57 to defeat the sealing action. The ferrule need only be long enough to accomplish this purpose and, as shown in Fig. 7, may be co-extensive with only approximately the inner half of the sleeve part. As in the seals previously described, the inner end of the ferrule stops short of the annular edge 58 so that this edge may be readily pressed against the shaft by the spring. The ferrule may be retained in proper axial position in the sleeve part of the packing element by providing such sleeve part with an internal annular groove 59 and the ferrule with an external annular flange 60 which engages in such groove. In assembling the ferrule into the sleeve part of the packing element, the flexibility of the packing material allows the ferrule to be pushed into the sleeve part far enough to permit the flange 60 to engage in the groove 59.

In Figs. 9 and 10 of the drawings I have shown a seal 62 which is of the same construction as the seal 52 of Fig. 7, with the exception that the pressure for holding the annular edge 58 in scraping engagement with the shaft, is obtained from a coil spring 63 disposed around the shaft and a spring plate 64 cooperating with the inner end of the sleeve part 53, instead of from a garter spring. The spring plate 64 is provided with a tapering or substantially conical portion 65, which engages the extreme inner end of the sleeve part 53 and under the action of the spring 63 causes such inner end to be contracted to press the annular edge 58 into scraping engagement with the shaft.

In Figs. 11 and 12 of the drawings I have shown a seal 68 differing from those above described in that this latter form of seal does not employ a ferrule in the tapered sleeve part of the packing element, but includes means for maintaining the sleeve part under tension and thus preventing undesirable distortion or collapse of the sleeve part. This packing may include a cup-like metal shell 69 in which the ring part 70 of the flexible packing element 71 is seated. The packing element includes a sleeve part 72 which is formed integral with the ring part 70 and extends inwardly around the shaft 18. The sleeve part 72 is of tapered form so that only the sharp annular edge 73 at the extreme inner end of the sleeve part contacts the shaft.

The inner end of the sleeve part of the packing element is provided with an external annular bead 74 with which a spring plate 75 cooperates for causing the annular edge 73 to be pressed against the shaft. A metal ring 76 of annular cross-section may be disposed in the metal shell 69 inwardly of the ring part 70, and a coil spring 77 disposed around the sleeve part 72 bears against the metal ring 76 and the spring plate 75.

The spring plate 75 is provided with a tapered or frusto-conical part 78 which cooperates with a similarly shaped surface 79 on the annular bead 74, so that as the spring plate 75 is biased inwardly by the spring 77 there will be a tendency to contract the inner end of the sleeve part 72 and thus press the annular edge 73 against the shaft. With the arrangement just described it will be seen that the action of the spring against the plate 75 and against the metal ring 76 causes the sleeve part 72 to be maintained under tension, thus causing the sleeve part to retain substantially its original shape so that all portions thereof, other than the annular edge 73, will remain in spaced relation to the shaft 18.

In each of the various seals which I have illustrated and described, it will be noted that a relatively sharp annular edge or corner at the inner end of a tapered sleeve part of a packing element is pressed into scraping engagement with a surface of a shaft by spring pressure, and that this pressure is applied in such a way that even though the packing wears during the operation of the device to which the seal is applied, the seal will adjust itself so that only a very narrow annular edge or part will be pressed against the shaft. By reason of this self-adjusting characteristic of my improved seal, it will be seen that it will always provide an efficient and reliable seal against leakage of fluid past a shaft bearing.

While I have illustrated and described the improved seals of my invention in a detailed manner, it will be understood, of course, that I do not wish to be limited to the precise details of construction and arrangement of parts illustrated and described, but regard my invention as including such changes and modifications as do not involve a departure from the spirit of the invention and the scope of the appended claims.

Having thus described my invention, I claim:

1. In a seal, the combination with a hollow part into which a shaft extends, of a packing in said hollow part comprising a body of flexible material having a tapering sleeve portion, the inner annular edge of which is adapted to grip the shaft; a frusto-conically shaped rigid member engaging the inner wall of said sleeve portion at points remote from its inner annular edge, said member being spaced from the shaft; and contractible means fitted about the outer surface of the sleeve and urging said sleeve into engagement with the rigid member and its inner annular edge with the shaft.

2. In a seal, the combination with a hollow part into which a shaft extends, of a packing in said hollow part comprising a body of flexible material having a tapering sleeve portion, the inner annular edge of which is adapted to grip the shaft; a frusto-conically shaped rigid member engaging the inner wall of said sleeve portion at points remote from its inner annular edge, said member being spaced from the shaft; and a spring fitted about the sleeve portion of the packing substantially in the plane of the lower edge of the rigid member, urging the packing into engagement with the rigid member and with the shaft.

3. In a seal, the combination with a hollow part into which a shaft extends, of a packing in said hollow part comprising a body of flexible material having a tapering sleeve portion, the inner annular edge of which is adapted to grip the shaft; a rigid lining member for the sleeve portion of the packing, its lower edge terminating short of said inner annular edge of the sleeve portion and being spaced from the shaft; and means fitting about the said sleeve in a plane substantially passing along the lower edge of the lining member, for urging said sleeve into constant engagement with the lining member and shaft.

4. In a seal, the combination with a hollow part into which a shaft extends, of a packing in said hollow part comprising a body of flexible material having a tapering sleeve portion, the inner annular edge of which is adapted to grip the shaft; a rigid ferrule for the inner wall of said sleeve, the lower edge of said ferrule being spaced from the inner annular edge of the sleeve; and a spring fitted about the sleeve substantially in a line with the lower edge of the ferrule, for urging the sleeve constantly to engage the ferrule and the shaft.

JOSEPH E. PADGETT.